United States Patent [19]

Ise et al.

[11] Patent Number: 4,955,448

[45] Date of Patent: Sep. 11, 1990

[54] CONTROLLER FOR REDUCING ACCELERATION SLIPPAGE OF A DRIVEN WHEEL

[75] Inventors: Kiyotaka Ise; Kozo Fujita, both of Susono, Japan

[73] Assignee: Toyota Jidosha Kabushiki Kaisha, Japan

[21] Appl. No.: 313,453

[22] Filed: Feb. 22, 1989

[30] Foreign Application Priority Data

Feb. 29, 1988 [JP] Japan ................................. 63-46364

[51] Int. Cl.$^5$ .................. B60K 31/00; B60L 3/10; B60T 8/32
[52] U.S. Cl. ..................... 180/197; 303/103; 364/426.02; 364/426.03
[58] Field of Search .................. 180/197, 233; 364/426.02, 426.03; 361/238; 303/95, 100, 103

[56] References Cited

U.S. PATENT DOCUMENTS

| | | | |
|---|---|---|---|
| 3,709,565 | 1/1973 | Jonason et al. | 361/238 X |
| 4,637,487 | 1/1987 | Nakamura et al. | 180/197 |
| 4,648,663 | 3/1987 | Nomura et al. | 180/197 X |
| 4,682,295 | 7/1987 | Kubo | 361/238 X |
| 4,685,547 | 8/1987 | Ohashi et al. | 180/197 |
| 4,722,411 | 2/1988 | Ohashi et al. | 180/197 |
| 4,736,814 | 4/1988 | Yogo et al. | 180/197 |
| 4,739,856 | 4/1988 | Inagaki et al. | 364/426.03 |
| 4,760,893 | 8/1988 | Sigi et al. | 364/426.02 |
| 4,766,972 | 8/1988 | Takata et al. | 180/197 |
| 4,774,667 | 9/1988 | Kuraoka et al. | 364/426.02 |
| 4,805,104 | 2/1989 | Kishimoto et al. | 180/197 X |
| 4,811,808 | 3/1989 | Matsumoto et al. | 180/197 |
| 4,823,269 | 4/1989 | Fujioka et al. | 364/426.03 |
| 4,824,184 | 4/1989 | Spadafora et al. | 364/426.02 |

FOREIGN PATENT DOCUMENTS

| | | |
|---|---|---|
| 3206694 | 9/1983 | Fed. Rep. of Germany . |
| 3603765A1 | 8/1986 | Fed. Rep. of Germany . |
| 60-128057 | 7/1985 | Japan . |
| 61-1543 | 1/1986 | Japan . |
| 61-85248 | 4/1986 | Japan . |
| 61-182434 | 8/1986 | Japan . |
| 61-283736 | 12/1986 | Japan . |
| 62-149545 | 7/1987 | Japan . |

Primary Examiner—Mitchell J. Hill
Attorney, Agent, or Firm—Oliff & Berridge

[57] ABSTRACT

The acceleration-slippage controller reduces acceleration slippage at a driven wheel of an automobile by adjusting brake force on the driven wheel, and an opening of a throttle valve of the engine. When the brake-force control increases the brake force to reduce the driven-wheel rotation, the moving speed of the throttle valve is corrected toward the closed position. Because the throttle valve control correlates to the brake control, their combined control can quickly reduce the driven-wheel speed to its target without causing hunting of the throttle valve opening.

7 Claims, 12 Drawing Sheets

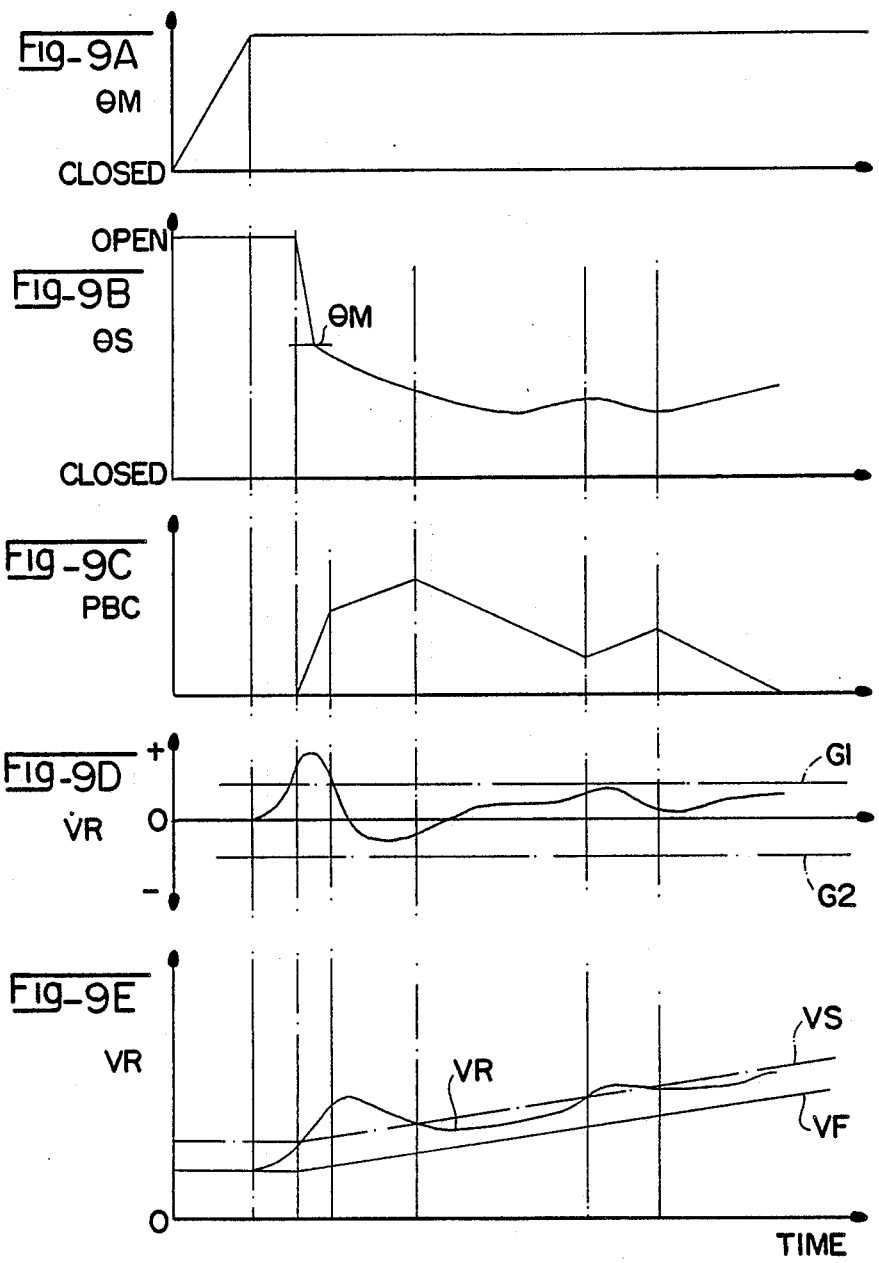

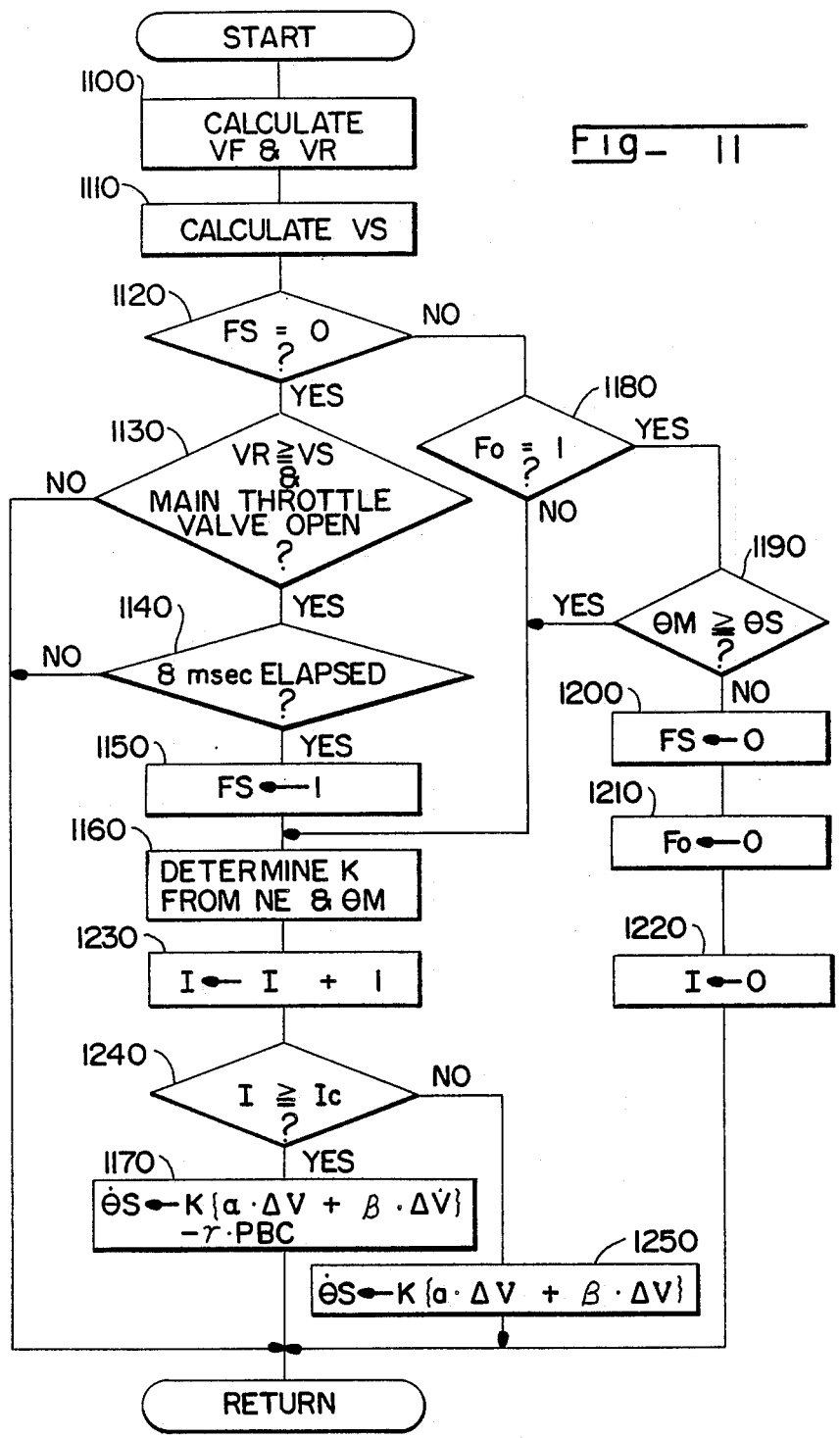

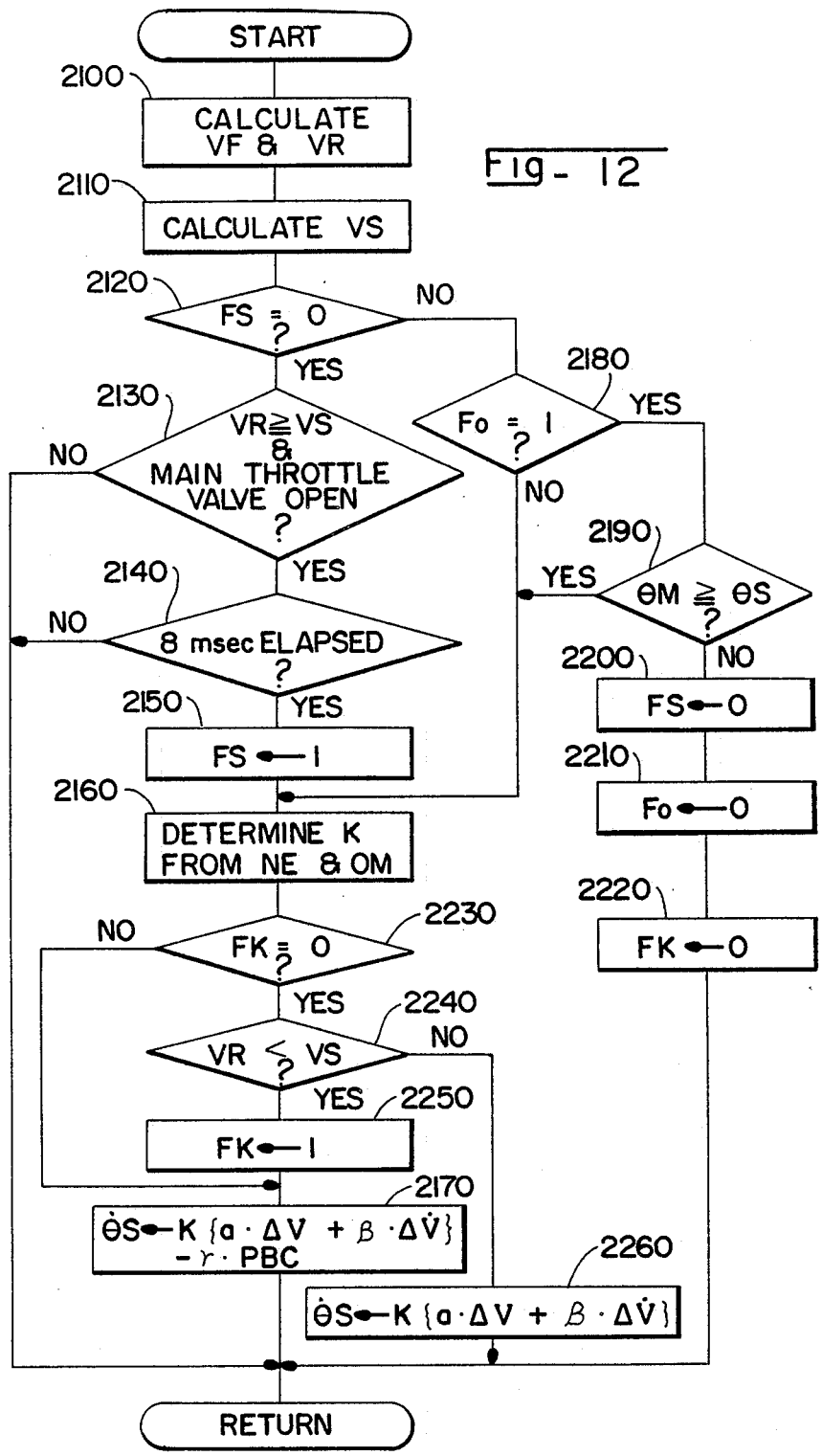

CONTROLLER FOR REDUCING ACCELERATION SLIPPAGE OF A DRIVEN WHEEL

BACKGROUND OF THE INVENTION

This invention relates to an acceleration-slippage controller for reducing slippage that occurs between the driven wheel and the road surface during vehicle acceleration.

An example of the prior-art controllers for reducing the acceleration slippage is disclosed in Japanese Published Unexamined Patent Application S61-85248. When acceleration slippage occurs at a driven wheel, this controller executes both the throttle valve control and the brake control to slow the revolution of the driven wheel. This device has been contrived because the throttle valve control and the brake control are individually inadequate because of the respective shortcomings set forth below:

(1) The throttle valve control cannot quickly lower the output torque of the engine to slow the driven wheel's revolution.

(2) The brake control can quickly reduce the driven wheel's revolution. However, it shortens the lifetime of the braking device because the brake control must reduce the driven wheel's revolution against the driving torque of the engine, thus applying a considerable load to the braking device.

When the throttle valve control and the brake control are started together as in the discussed prior art, each compensates for the other's shortcoming, thus efficiently reducing the acceleration slippage at the driven wheel.

In the prior-art controller described above, the throttle valve control and the brake control work independently of each other, but they influence each other. Specifically, both the brake control and the throttle control depend on the driven-wheel speed, and the efficiency of the brake control in reducing the driven-wheel speed is about ten times greater than that of the throttle control. As a result, the driven-wheel speed on which the throttle control depends is greatly influenced by the brake control, that is, the throttle opening is greatly influenced by the brake force, resulting in hunting. This lengthens the time necessary to control the acceleration slippage, which is contrary to the reason for combining the controls in the first place.

To solve this problem, another controller has been proposed where the reference value VB of the driven-wheel speed for the brake control is preset greater than the reference value VS for the throttle valve control. The brake control is executed only when severe acceleration slippage occurs at the driven wheel, to minimize the period of combined control.

The problem described above, however, remains as long as the two controls are executed together. Further, since the brake control is not executed until the driven-wheel speed exceeds the higher reference value VB, the responsiveness of the acceleration-slippage control deteriorates when the driven-wheel speed approaches the lower reference value VS.

SUMMARY OF THE INVENTION

An object of the invention is, therefore, to provide an acceleration-slippage controller that reduces acceleration slippage such that the brake control and the throttle valve control are executed simultaneously so as to quickly reduce the driven-wheel speed to its target, and that prevents the undesired interference of the brake control and the throttle valve control with each other.

This object is achieved by the present invention as schematically illustrated in FIG. 1. The invention is a controller for reducing acceleration slippage at a driven wheel of an automobile having an internal combustion engine M4. The controller comprises: a driven-wheel speed sensor M1 for sensing a speed of the driven wheel; an acceleration-slippage detector M2 for calculating slippage at the driven wheel based on the sensed driven-wheel speed when the automobile is accelerating; a throttle-valve controller M6 for adjusting an opening of a throttle valve M5 of the engine M4 to control slippage; a brake controller M7 for adjusting brake force of the driven wheel to control the slippage; a brake-force detector M8 for detecting brake force on the driven wheel; and a correcting means M9 for correcting the throttle-valve controller M6 to bias the opening toward the closed position in response to greater detected brake force.

In the acceleration-slippage controller of the present invention, the accleration-slippage detector M2 detects acceleration slippage requiring control for the vehicle to accelerate properly. This acceleration slippage is detected when the driven-wheel acceleration obtained from the driven-wheel speed exceeds a preset value. Acceleration slippage may also be detected when the driven-wheel speed exceeds a reference value determined from the vehicle speed. Moreover, this reference value may also be used as the target value for the drive-wheel speed in the acceleration-slippage control.

If the braking device M3 uses an oil brake system, the brake-force detector M8 detects the brake oil pressure as the indicator of the brake force of the driven wheel. In case of an air brake, the brake-force detector M8 detects the air pressure. Since it is sufficient for the brake-force detector M8 to detect brake force only during the acceleration-slippage control, the brake-force detector M8 may determine the brake force from a control amount for the braking device M3 during the acceleration-slippage control.

When the acceleration-slippage detector M2 detects acceleration slippage on the driven wheel, the throttle-valve controller M6 and the brake controller M7 start their respective adjustments. The respective control amounts for the braking device M3 and the throttle valve M5 are individually determined according to the difference between the actual driven-wheel speed and the target speed. The brake-force detector M8 detects brake force on the driven wheel so that the correction means M9 can correct the control amount (e.g., moving speed) for the throttle valve M5 toward the closed position according to the detected brake force.

When the brake force becomes greater because of brake control against a large acceleration (i.e., when the rotation of the driven wheel greatly changes), the sub-throttle valve is quickly moved toward the closed position, or, when opening, its opening speed is reduced. Since the throttle opening is thus controlled, the brake control can quickly reduce the driven-wheel speed to the target speed without fluctuating the sub-throttle opening.

BRIEF EXPLANATION OF THE DRAWINGS

FIGS. 9A, 9B, 9C, 9D and 9E are timing charts for the main throttle valve opening $\theta M$ (FIG. 9A), the sub-throttle valve opening $\theta S$ (FIG. 9B), the brake oil pressure PBC in the wheel cylinders of driven wheels (FIG. 9C), the driven-wheel acceleration $\dot{V}R$ (FIG. 9D), and the driven-wheel speed VR (FIG. 9E) in the acceleration-slippage control according to the first embodiment.

FIG. 11 is a flow chart showing a process for calculating a control amount for the sub-throttle valve in a second embodiment.

FIG. 12 is another flow chart showing a process for calculating a control amount for the sub-throttle valve in a third embodiment.

DETAILED DESCRIPTION OF PREFERRED EMBODIMENTS

One embodiment of the present invention is a rear-wheeldrive vehicle equipped with the acceleration-slippage controller of this invention.

Figure 1:
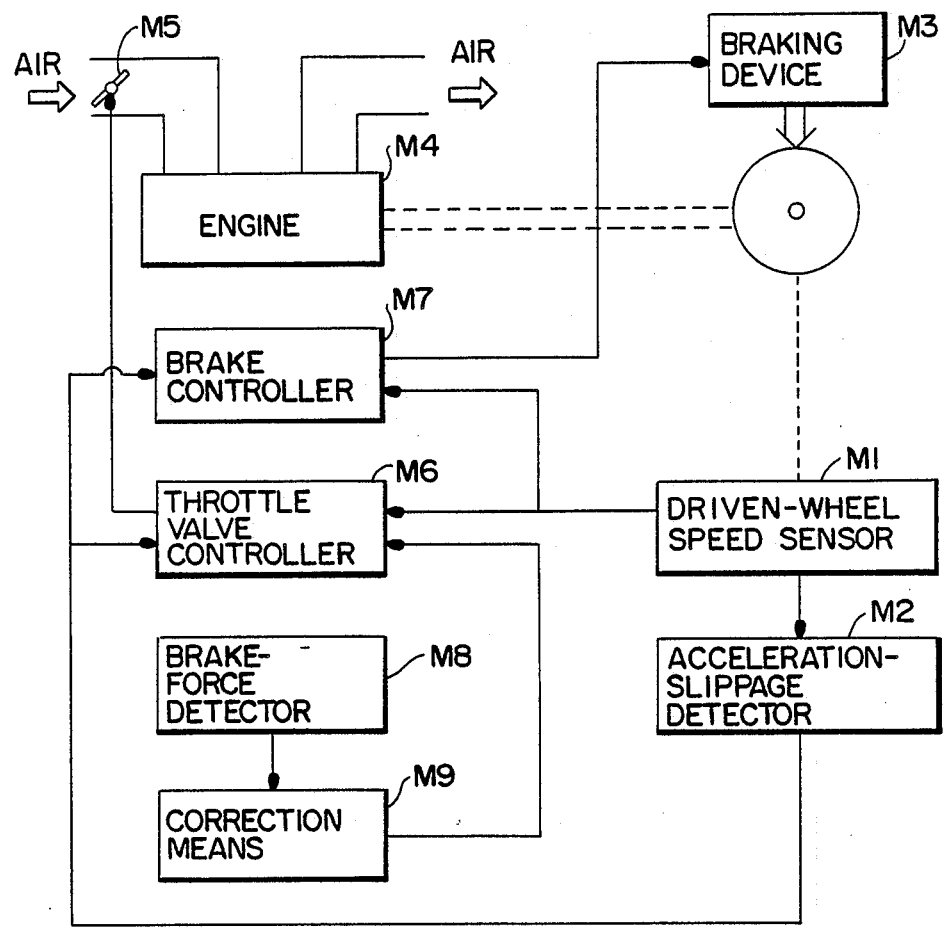
FIG. 1 is a block diagram showing a basic structure of this invention.
Figure 2:
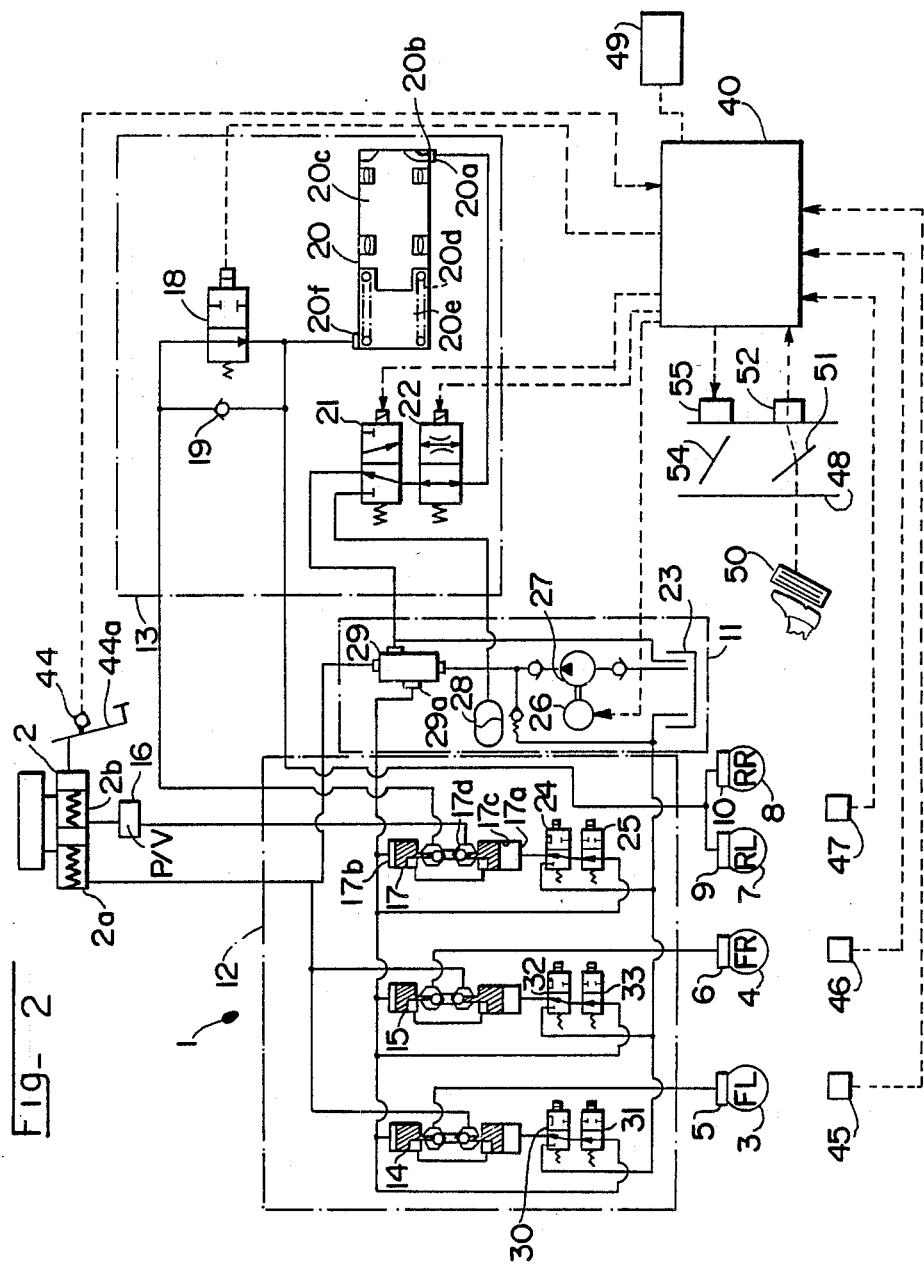
FIG. 2 is a schematic diagram of the brake system and its control system of a rear-wheel-drive vehicle embodying an acceleration-slippage controller of this invention.

First, the oil brake system is explained. In FIG. 2, the oil brake system includes: a brake master cylinder 2; left and right front wheel cylinders 5 and 6 for the non-driven wheels 3 and 4; left and right rear wheel cylinders 9 and 10 for the driven wheels 7 and 8; an oil pressure source 11; an oil circuit 12 for anti-skid control; and another oil circuit 13 for the acceleration-slippage control. The oil pressure source 11 and the oil circuits 12 and 13 are between the master cylinder 2 and the wheel cylinders 5, 6, 9 and 10.

Between a first chamber 2a of the brake master cylinder 2 and the wheel cylinders 5 and 6 of the left and the right front wheels 3 and 4 are left and right front volume control valves 14 and 15, respectively, for the anti-skid control. Between a second chamber 2b of the brake master cylinder 2 and the wheel cylinders 9 and 10 of the left and right rear wheels 7 and 8 are: a proportional valve 16; a rear volume-control valve 17 for the anti-skid control; a first solenoid valve 18 and a check valve 19 that are in parallel; and a volume-control valve 20 for the acceleration-slippage control.

During anti-skid execution, the first solenoid valve 18 is not energized but rests at the position shown in FIG. 2, allowing communication between the anti-skid volume-control valve 17 and the acceleration-slippage volume-control valve 20. A second solenoid valve 21 and a third solenoid valve 22, sequentially connected to a control input port 20a of the acceleration-slippage volume-control valve 20, are not energized but rest at the position shown in FIG. 2, allowing communication between a pressure control chamber 20b and a reservoir 23 of the oil pressure source 11.

A piston 20c of the acceleration-slippage volume-control valve 20 is biased by a spring 20d into the position shown in FIG. 2. At this time, the anti-skid volume-control valve 17 moves into one of three states depending on the energized or de-energized states of a first rear change valve 24 connected to a first control input port 17a of the anti-skid volume-control valve 17, and of a second rear change valve 25 sequentially connected to the first change valve 24. The three states are as follows:

(A1) An output port 29a of a regulator 29 and the first control input port 17a communicate. Here, the regulator 29 modulates the oil pressure from an oil pump 27 or from an accumulator 28 of the oil pressure source 11 according to the brake pedal 50 position. The oil pump 27 is driven by an oil pump motor 26.

(A2) The first input port 17a, regulator 29 and reservoir 23 are disconnected from one another.

(A3) The first input port 17a and the reservoir 23 communicate.

A second control input 17b of the rear anti-skid volume control valve 17 always communicates with the output port 29a of the regulator 29. Therefore, the rear anti-skid volume control valve 17 responds to the above three states as follows. The oil pressure within a first oil chamber 17c having the first input port 17a is: (A1) increased, (A2) maintained, or (A3) decreased. The volume of a brake pressure chamber 17d changes according to the pressure in the first oil chamber 17c. Through this mechanism, the rear anti-skid volume control valve 17: (A1) increases, (A2) maintains, or (A3) decreases the pressure in the left and right rear wheel cylinders 9 and 10 via the first solenoid valve 18 and the check valve 19. Similarly, the left and right front anti-skid volume control valves 14 and 15 work against the left and right front wheel cylinders 5 and 6 depending on the energized or de-energized states of left front first and second change valves 30 and 31 and right front first and second change valves 32 and 33. The first and second change valves 24, 25, 30, 31, 32 and 33 are energized or de-energized by an anti-skid control circuit (not shown).

During the acceleration-slippage control, the first solenoid valve 18 is energized to move into a right side position in FIG. 2, which blocks the oil path. This cuts the communication between the rear anti-skid volume-control valve 17 and the acceleration-slippage volume-control valve 20 due to the first solenoid valve 18 and the check valve 19. At this time, the acceleration-slippage volume-control valve 20 moves into one of four states, as follows, depending on the energized or de-energized states of the second and third solenoid valves 21 and 22, which are sequentially connected to the control input port 20a.

(B1) The accumulator 28 and the control input port 20a communicate without resistance.

(B2) The accumulator 28 and the control input port 20a communicate via a throttle valve of the third solenoid valve 22.

(B3) The reservoir 23 and the control input port 20a communicate via the throttle valve of the third solenoid valve 22.

(B4) The reservoir 23 and the control input port 20a communicate without resistance.

The acceleration-slippage volume-control valve 20 responds to the above four states as follows. The pressure in the pressure control chamber 20b having the control input port 20a: (B1) quickly increases, (B2) slowly increases, (B3) slowly decreases, or (B4) quickly decreases. This change of the pressure alters the volume of the pressure control chamber 20b and moves the piston 20c to the right or left in FIG. 2 against the force of the spring 20d. With this movement of the piston 20c, oil pressure is supplied from an output port 20f of a brake oil pressure chamber 20e to the left and right rear wheel cylinders 9 and 10, making the pressure within the wheel cylinders 9 and 10: (B1) quickly increase, (B2) slowly increase, (B3) slowly decrease, or (B4) quickly decrease, all according to the above four states of the acceleration-slippage volume-control valve 20.

Acceleration slippage is controlled by a control circuit 40. The acceleration-slippage control circuit 40 connects to: a pedal switch 44 for generating an ON signal when a brake pedal 44a is pressed; a left front wheel speed sensor 45, a right front wheel speed sensor 46 and a rear wheel speed sensor 47 for sensing the revolution speed of the left front wheel 3, the right front wheel 4 and the rear wheels 7 and 8, respectively; an engine speed sensor 49 for sensing the revolution speed of an engine, which drives the rear wheels 7 and 8; and a throttle position sensor 52 for sensing the opening of a main throttle valve 51 that opens and closes an intake pipe 48 of the engine according to the depression of an accelerator pedal 50. The output signals from the above switch and sensors are transmitted to the acceleration-slippage control circuit 40, which then detects acceleration slippage and drives the first, second and third solenoid valves 18, 21 and 22, respectively, and the oil pump motor 26 for the brake control of the rear wheels.

The rear wheel speed sensor 47 is located on the transmission output shaft that transmits the rotation from the engine to the rear wheels 7 and 8. This sensor 47 detects the average rotational speed of the rear wheels 7 and 8, which are rotated by the differential gear.

The acceleration-slippage control circuit 40 further connects to a drive motor 55 of a sub-throttle valve 54 provided sequentially with the main throttle valve 51 in the intake pipe 48 of the engine. When acceleration slippage occurs, the acceleration-slippage control circuit 40 controls the opening of the sub-throttle valve 54 to adjust the output torque of the engine.

Figure 3:
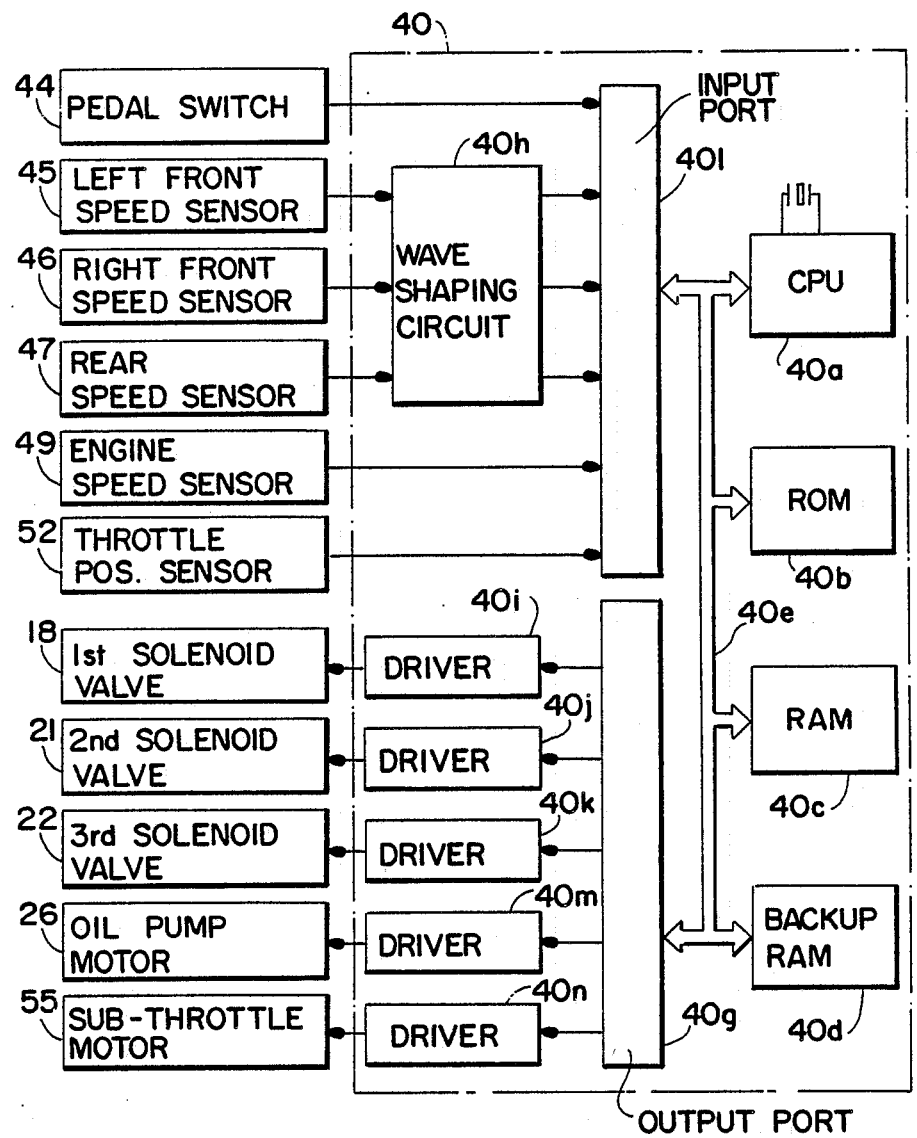
FIG. 3 is an electrical block diagram of the acceleration-slippage control circuit of embodiments.

As shown in FIG. 3, the acceleration-slippage control circuit 40 is a microcomputer including: a CPU 40a, ROM 40b, RAM 40c, backup RAM 40d, input and output ports 40f and 40g, respectively, an interconnecting bus 40e, a wave shaping circuit 40h, and driver circuits 40i, 40j, 40k, 40m, and 40n for solenoid valves and motors. The pedal switch 44, the engine speed sensor 49 and the throttle position sensor 52 directly connect to the input port 40f. The speed sensors 45, 46 and 47 for the left front, right front, and rear wheels, respectively, connect to the input port 40f via the wave shaping circuit 40h. The CPU 40a receives signals from these switches and sensors via the input port 40f, processes them, and sends control signals to the first, second, and third solenoid valves 18, 21, and 22, oil pump motor 26 and sub-throttle valve motor 55 via the output port 40g and the driver circuits 40i, 40j, 40k, 40m and 40n.

Figure 4:
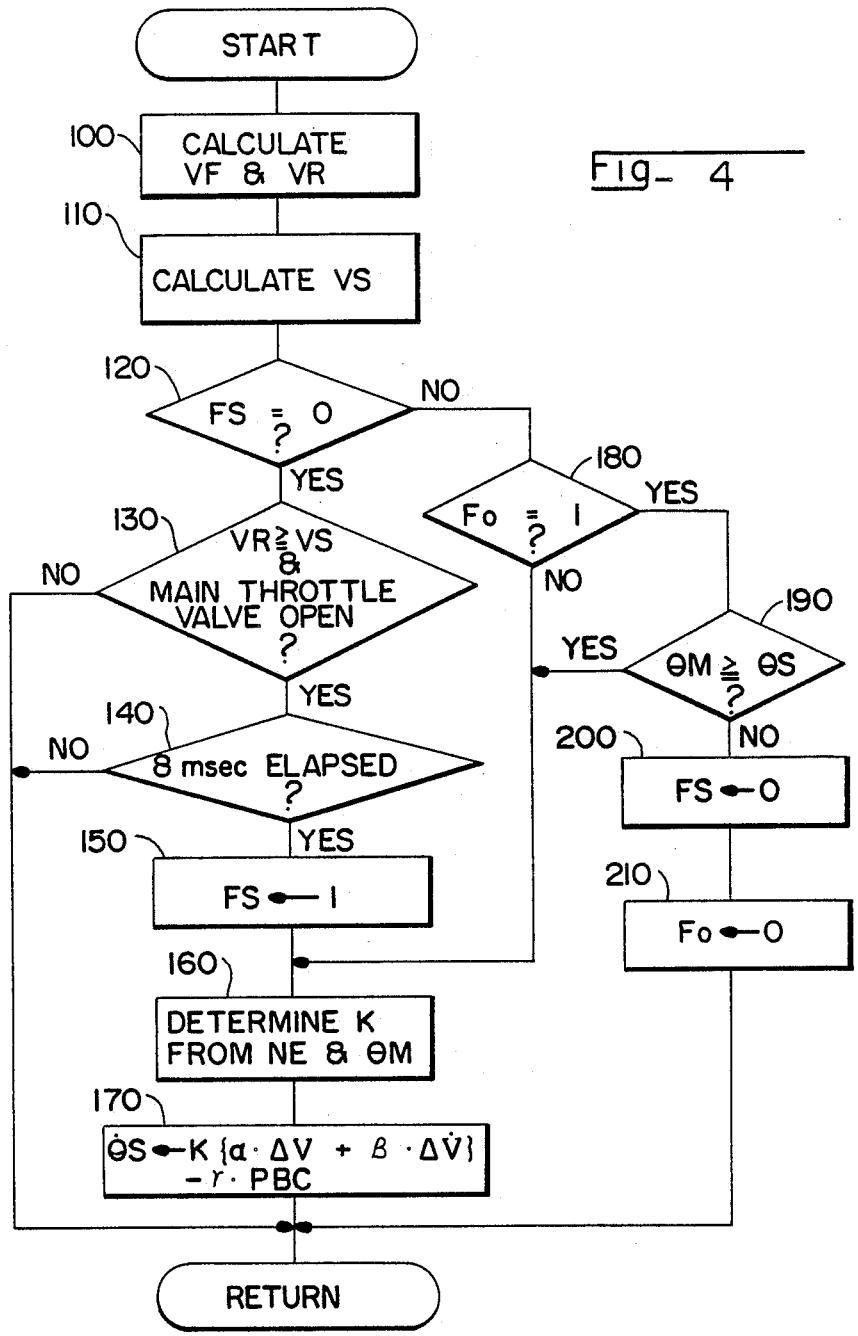
FIG. 4 is a flow chart showing a process for calculating a control amount for the sub-throttle valve in a first embodiment.
Figure 5:
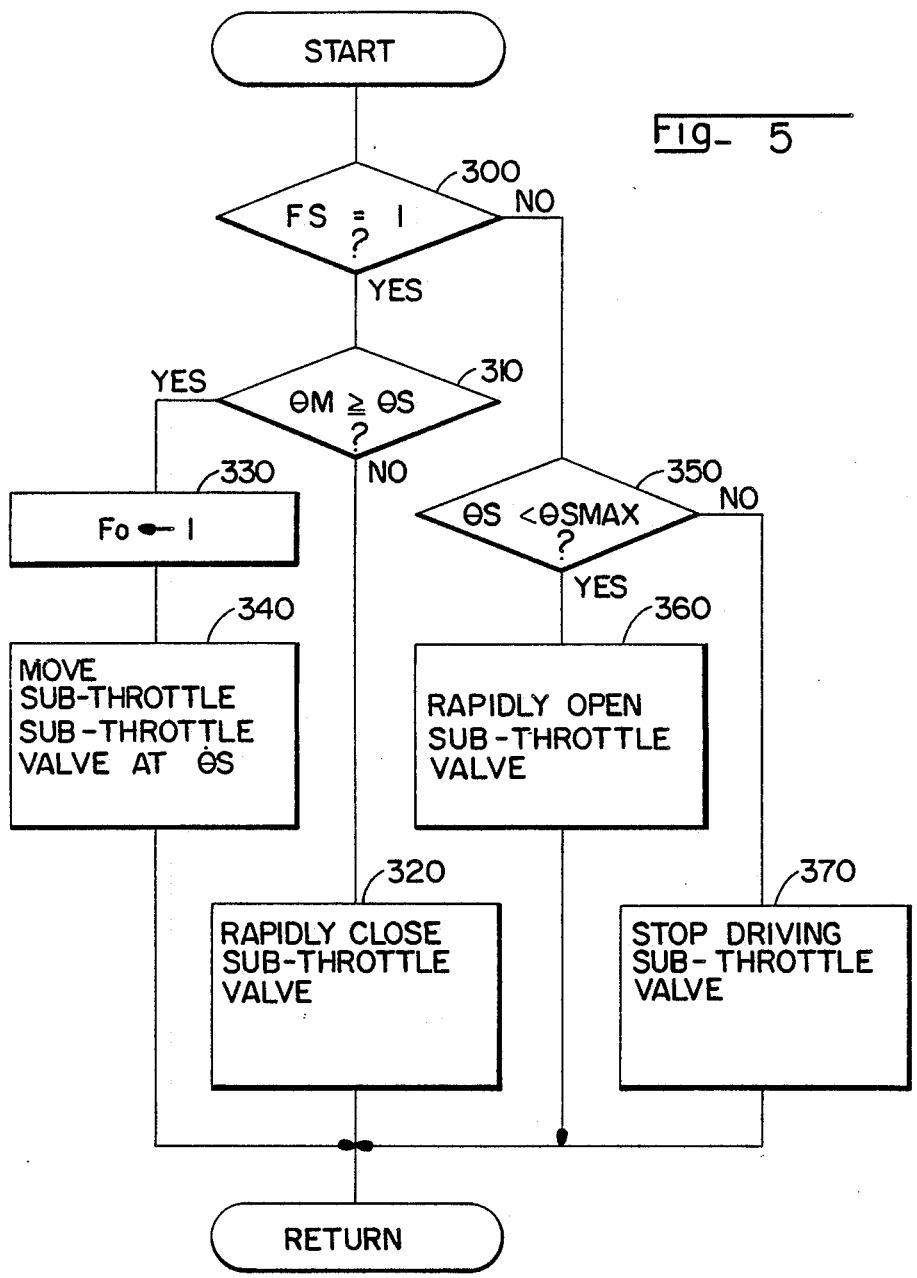
FIG. 5 is a flow chart showing a process for driving the sub-throttle valve.
Figure 6:
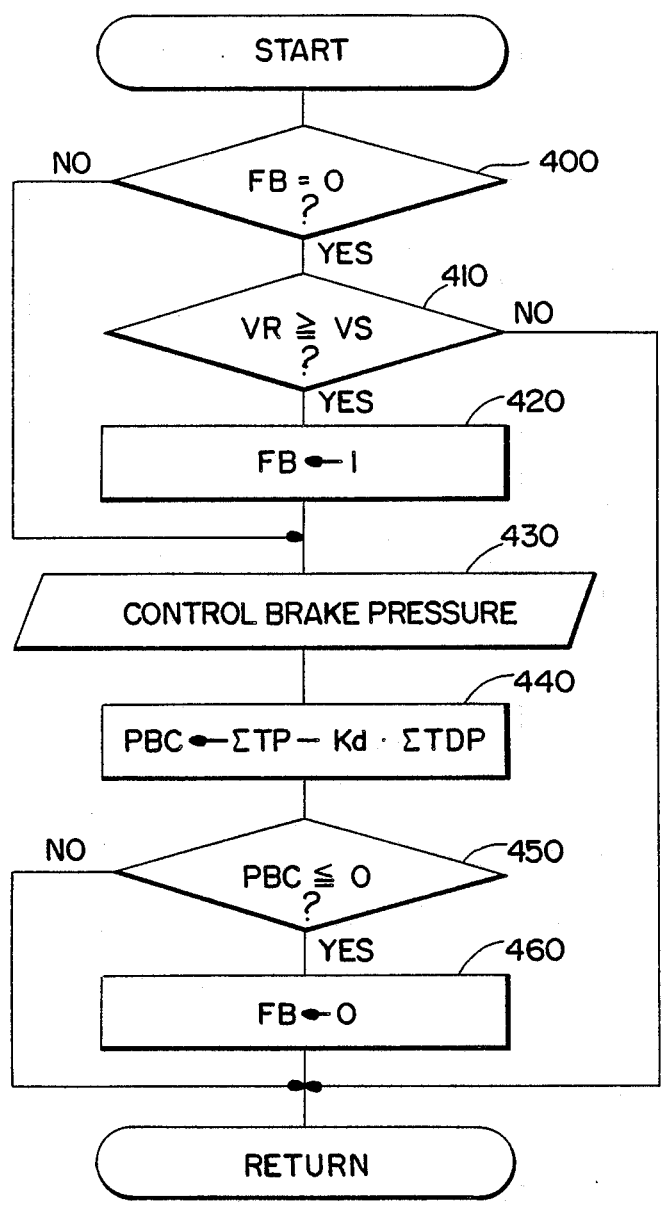
FIG. 6 is a flow chart of a brake control routine.

The acceleration-slippage control executed in the acceleration-slippage control circuit 40 is shown in FIGS. 4, 5, and 6.

The flow chart of FIG. 4 shows a process of calculating the control amount for the sub-throttle valve 54 with the routine being repeated at predetermined intervals. When the routine in FIG. 4 is started, a vehicle speed VF and a driven-wheel speed VR are calculated at step 100 based on the detected signals from the left front, right front, and rear wheel speed sensors 45, 46, and 47. The vehicle speed VF is calculated by multiplying the average value of outputs of the left and right front speed sensors 45 and 46 (or the greater of the two outputs) by the peripheral length of a front wheel. The driven-wheel speed VR is calculated by multiplying an output of the rear wheel rotational speed sensor 47 by the peripheral length of a rear wheel.

From the vehicle speed VF, a reference value VS is calculated at step 110 as follows.

$$VS = VF \cdot a \tag{1}$$

Here, the value a is a coefficient (reference slip rate) greater than one, predetermined to maximize the driving force (or traction force) of the driven wheel on the road. For example, the value a ranges from 1.12 to 1.20. Instead of the above formula (1), the following equation may be used to determine the reference value VS.

$$VS = VF + b \tag{2}$$

where, $b > 0$.

Then, at step 120, it is determined whether the value of a flag FS is zero: the flag FS is set to one when the sub-throttle valve control is under way, and is reset to zero when the sub-throttle valve control is not executed. When FS=0, it is then determined at step 130 whether the condition to start the sub-throttle valve control exists. Specifically, it is determined whether the driven-wheel speed VR exceeds the reference value VS and whether the main throttle valve 51 is partially open. When this condition does not exist at step 130, no further processing occurs. When the condition exists, the process proceeds to step 140.

The acceleration-slippage control does not begin until a predetermined period (e.g., 8 msec) elapses at step 140. The delay at step 140 is introduced because the sub-throttle control should not be started when the driving wheels 7 and 8 are coasting over sporadic irregularities in the road surface.

Figure 7:
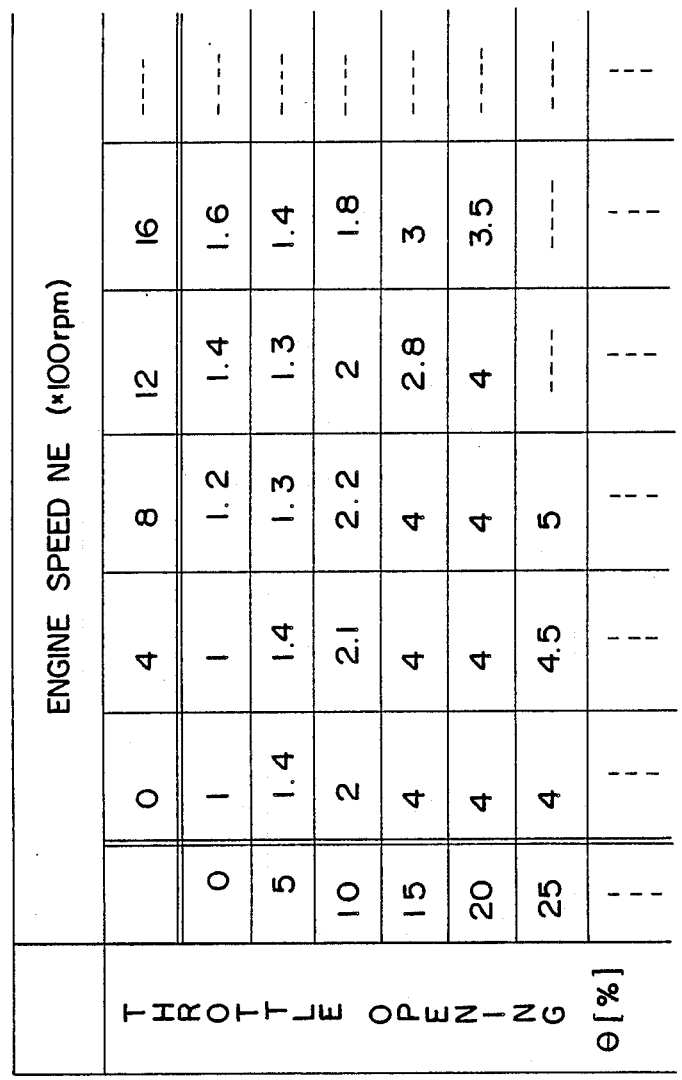
FIG. 7 shows a part of a table for determining a correction factor K for use in the calculation of the sub-throttle valve opening speed.
Figure 8:
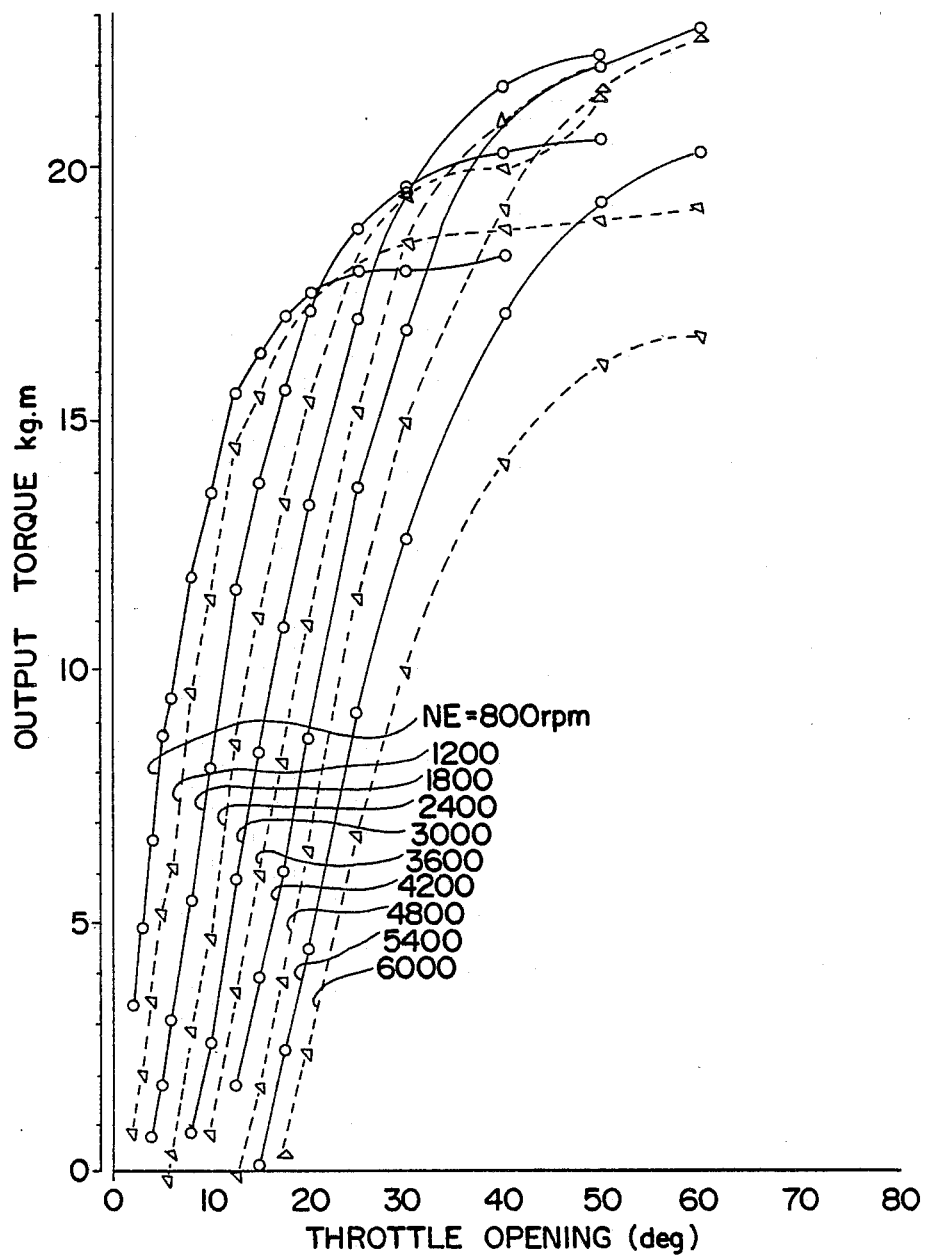
FIG. 8 is a graph showing the relationship between the throttle valve opening and the engine output torque.
Figure 10A:
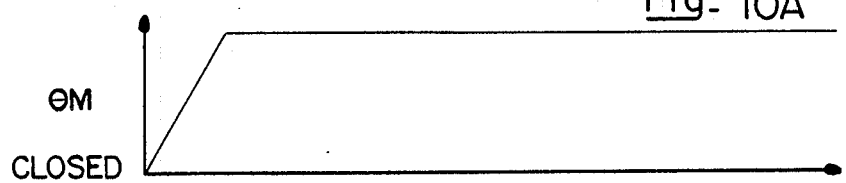
FIGS. 10A, 10B, 10C, 10D and 10E are timing charts according to the prior-art acceleration-slippage control.
Figure 10B:
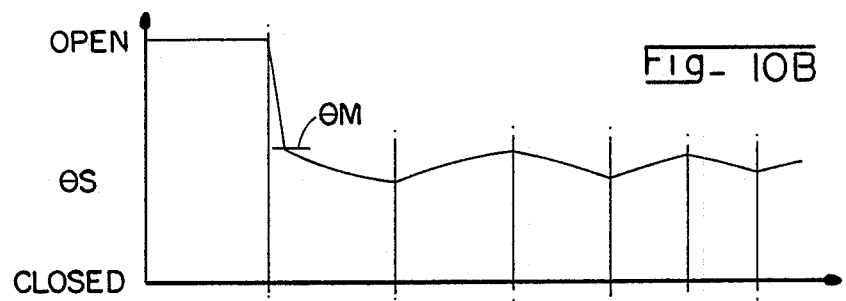
Figure 10C:
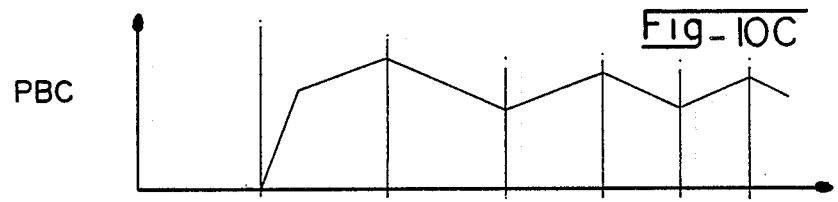
Figure 10D:
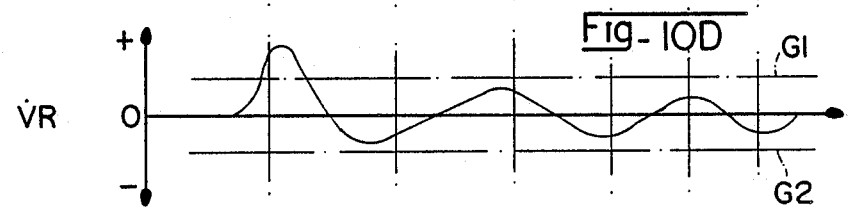
Figure 10E:
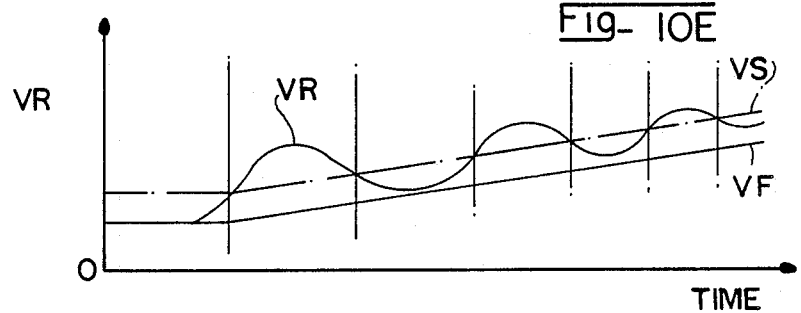

After the 8-msec delay elapses, the flag FS is set to one at step 150, and then a correction factor K is determined at step 160 by an interpolation from a table stored in the ROM 40b, as partially shown in FIG. 7, based on the revolution speed NE of the engine and on a throttle valve opening $\theta$. The correction factor K is introduced to compensate for the nonlinear relationship between the throttle valve opening $\theta$ and the engine output torque. As seen in FIG. 8, the output torque quickly responds to a narrow opening of a throttle valve, but hardly responds to further opening of the valve at all. The correction factor K, therefore, prevents an excessive opening of the sub-throttle valve 54 and maintains sharp responsiveness while the sub-throttle valve opening is adjusted.

For calculation of the correction factor K, the throttle opening $\theta$ is the opening $\theta M$ of the main throttle valve 51 when the opening $\theta M$ is less than the opening $\theta S$ of the sub-throttle valve 54 (e.g., at the beginning of the throttle valve control). Alternatively, the throttle opening $\theta$ is the opening $\theta S$ of the sub-throttle valve 54 when θS is less than θM after the throttle valve control, described later, is started.

After step 160, a control amount (i.e., opening speed) θ̇S for the sub-throttle valve 54 is calculated at step 170 by the following equation (3). The control amount θ̇S is a time derivative of the sub-throttle opening θS, and it is the target speed for driving the sub-throttle valve motor 55.

$$\dot{\theta}S = K\{\alpha \cdot \Delta V + \beta \cdot \Delta \dot{V}\} - \gamma \cdot PBC \quad (3)$$

Here: $\alpha$ is a proportional gain; $\beta$ is a differential gain; $\Delta V$ is a difference between the reference driven-wheel speed VS and the actual driven-wheel speed VR (i.e., VS−VR); $\Delta \dot{V}$ is its time derivative; and PBC is a brake oil pressure on the driven wheel and $\gamma$ is its correction coefficient for the sub-throttle control amount θ̇S.

When FS=1 at step 120, indicating that the sub-throttle valve control is under way, it is subsequently determined at step 180 whether the value of a flag Fo is 1: the flag Fo is set to 1 when the opening θS of the sub-throttle valve 54 becomes equal to or less than the opening θM of the main throttle valve 51 because of the sub-throttle valve control. If Fo=0 at step 180, the process goes to step 160. If Fo=1, indicating that θS has become less than θM, it is then determined at step 190 whether the sub-throttle opening θS now is equal to or greater than the main throttle opening θM. If θM≧θS, the flow goes to step 160 for the calculation of the control amount θ̇S for the sub-throttle valve 54. If θM<θS at step 190, on the other hand, it is assumed that no further acceleration slippage will occur at the driven wheels. Thus, the flags FS and Fo are reset to zero at step 200 and step 210, respectively, before the routine ends.

FIG. 5 shows a process of driving the sub-throttle valve 54 at predetermined intervals according to the control amount θ̇S.

At step 300, it is determined whether the flag FS remains set at one. If so, then it is determined at step 310 whether the sub-throttle opening θS is less than or equal to the main throttle opening θM. If θM<θS, the processing flow goes to step 320 where the drive motor 55 rapidly closes the sub-throttle valve 54. If θM≧θS, on the other hand, the flag Fo is set to one at step 330, and then the drive motor 55 runs at step 340 to move the sub-throttle valve 54 at the control amount θ̇S.

If FS=0 at step 300, it is determined at step 350 whether the sub-throttle valve 54 is fully open, or whether the sub-throttle opening θS is less than its maximum opening θSMAX. If θS<θSMAX, the drive motor 55 rapidly opens the sub-throttle valve 54 at step 360. If θS≧θSMAX indicating that the sub-throttle valve 54 is already fully opened, the drive motor 55 stops opening the sub-throttle valve 54 at step 370. After steps 320, 340, 360 and 370, the routine ends.

In this embodiment, the sub-throttle valve control is started as soon as acceleration slippage is detected from the difference ΔV between the driven-wheel speed VR and the reference value VS. When the sub-throttle opening θS, which is adjusted according to the difference ΔV and the brake oil pressure PBC, exceeds the main throttle opening θM, no further acceleration-slippage control is necessary, thus terminating the sub-throttle valve control.

FIG. 6 is a flow chart showing a routine for the brake control the acceleration-slippage control circuit 40 repeats in the same time intervals as in its routine for calculating the control amount for the sub-throttle valve 54 (FIG. 4). First, it is determined at step 400 whether the brake control is under way (i.e., whether the flag FB remains reset at zero).

If FB=0, then it is determined at step 410 whether the conditions to start the brake control exist. Specifically, it is determined whether the driven-wheel speed VR exceeds the reference value VS and the vehicle's driver is not stepping on the brake pedal 44a. When the conditions to start the brake control do not exist at step 410, no further processing is executed. When the conditions exist, the flag FB is set to one at step 420, and then the brake control is executed at step 430 according to TABLE 1:

TABLE 1

| speed | acceleration V̇R < G2 | G2 ≦ V̇R < G1 | G1 ≦ V̇R |
|---|---|---|---|
| VS ≦ VR | SD | SU | FU |
| VF ≦ VR < VS | FD | SD | SD |
| VR < VF | FD | FD | FD |

In TABLE 1, V̇R is an acceleration of the driven wheel, G1 is a positive reference acceleration, G2 is a negative reference acceleration, FU represents the quick increase in the oil pressure in the driven-wheel brake cylinders 9 and 10, and SU, FD, and SD represent the slow increase, quick decrease, and slow decrease of the oil pressure, respectively.

At step 430, driven-wheel acceleration V̇R is first calculated based on the driven-wheel speed VR. The oil pressure is increased if the driven-wheel speed V̇R exceeds the reference value VS and the driven wheel acceleration VR exceeds G2; otherwise the oil pressure is decreased. As a result, the brake system promptly reduces the driven-wheel speed.

At step 440, the brake oil pressure PBC of the driven wheel is determined as a difference between the accumulated value ΣTP of oil-pressure increasing time TP and the accumulated value ΣTDP of oil-pressure decreasing time TDP multiplied by a correction factor Kd (PBC=ΣTP−Kd·ΣTDP). Here the correction Kd is introduced because there is a difference in the rate of change between the increase and the decrease of the oil pressure.

Then, it is determined at step 450 whether the brake oil pressure PBC is less than or equal to zero. When PBC≦0 at step 450, brake control is terminated, and the flag FB is reset to zero at step 460. When PBC>0 at step 450, the routine ends with FB still one.

When acceleration slippage occurs, the brake control of this embodiment is continuously executed according to the driven-wheel speed VR and the driven wheel acceleration VR until the increased brake oil pressure PBC is reduced to zero.

FIGS. 9A through 9E are the timing charts for showing how the driven-wheel speed is reduced through the acceleration-slippage control of the present embodiment. The control amount θ̇S for the sub-throttle valve 54 is corrected, in formula (3), according to the brake oil pressure PBC (i.e., the brake force of the brake system), so that the sub-throttle valve 54 is biased to a closed position when the brake control raises brake oil pressure PBC. Because the sub-throttle valve control correlates to the brake oil pressure PBC, the moving direction of the sub-throttle valve 54, either to the open or the closed position, does not reverse even when the driven-wheel speed VR crosses the reference value VS (see FIGS. 9B and 9E). The acceleration-slippage controller of the present embodiment can, therefore, promptly converge the driven-wheel speed VR on the reference speed VS.

FIGS. 10A through 10E are the timing charts showing how the prior-art controller reduces the driven-wheel speed. Contrary to this embodiment, the prior-art controller determines the control amount θS for the sub-throttle valve 54 from the following formula (4) without considering the brake oil pressure PBC.

$$\dot{\theta}S = K \cdot \{\alpha \cdot \Delta V + \beta \cdot \Delta \dot{V}\} \quad (4)$$

In this case, the moving direction of the sub-throttle valve 54 follows the fluctuation of the driven-wheel speed VR (see FIGS. 10B and 10E), consequently delaying the convergence of the driven-wheel speed VR toward the reference value VS.

The present embodiment does not separately control brake oil pressure for the left and right rear wheels 7 and 8. Some vehicles equipped with an anti-skid control system can control the brake oil pressure separately for the left and right rear wheels 7 and 8. In such a vehicle, the brake control can be executed individually for each of the left and right rear wheels 7 and 8 according to the respective wheel speed. Since this can reduce the slippage by the rear wheels 7 and 8 even better, acceleration quality is improved especially while the vehicle is cornering or running on a road surface with different friction coefficients at the left and right wheels of the vehicle. With this latter control method, the control amount θS for the sub-throttle valve is determined using the lower one of brake oil pressures for the left and right rear wheels.

Although the same reference value for the driven-wheel speed is given to both the brake control and the throttle valve control, the brake control may be provided with a greater reference value, as explained in the prior-art description, to add the brake control only when severe acceleration slippage occurs. In this case, too, the present invention can prevent the brake control and the throttle valve control from adversely affecting each other.

In the present invention, the sub-throttle valve opening amount θS is modified by the brake oil pressure PBC from the beginning of the acceleration-slippage control. More precisely, the brake oil pressure PBC is determined in the acceleration-slippage brake control by: (i) the output torque of the engine, and (ii) the inertia of the driven wheel. That is, the brake oil pressure PBC is very high at the very beginning of the acceleration-slippage brake control in order to rapidly suppress the inertial rotation of the driven wheel. On the other hand, the purpose of the sub-throttle valve control in the acceleration-slippage control is to suppress the engine output torque. In that sense, sub-throttle valve opening should not be affected by that part of the brake oil pressure PBC suppressing the inertial rotation of the driven wheel. If the sub-throttle valve control amount θS is significantly affected by the high brake oil pressure PBC, the sub-throttle valve opening will close too much, and the acceleration itself will deteriorate.

To solve this problem, a second embodiment is carried out, altering a part of the process shown in FIG. 4, for calculating the control amount θS. At the very beginning of the acceleration-slippage control, the control amount θS for the sub-throttle valve 54 is determined from the formula (4) disregarding the brake oil pressure PBC. After a preset, short time interval from the beginning of the control, the control amount θS is determined from the formula (3) regarding PBC. FIG. 11 is the flowchart with such a delay system—steps 1220, 1230, 1240 and 1250—added to the flowchart in FIG. 4. The other steps remain the same as those in FIG. 4, and the last three digits in each step numeral in FIGS. 4 and 11 reveal the unchanged steps: for instance, steps 100 and 1100 are the same.

In the delay system of the second embodiment, a counter I that is cleared at step 1220 as soon as step 1190 determines that the sub-throttle valve control has ended. When the sub-throttle valve control starts in response to the YES determination at step 1140, the counter I is increased by 1 at step 1230. It is determined at the subsequent step 1240 whether the value of the counter I exceeds a predetermined value Ic. While I < Ic, indicating that the sub-throttle valve control has not continued for a predetermined period yet, the control amount θS is determined at step 1250 from the formula (4). If the predetermined period has elapsed (i.e., I ≥ Ic at step 1240), the control amount θS is determined at step 1170 from the formula (3) using the brake oil pressure PBC.

FIG. 12 is another flowchart made by partially altering the flowchart in FIG. 4 to show a third embodiment. As in FIG. 11, the last three digits in the step numerals in FIG. 12 are in common with those in FIG. 4. In this third embodiment shown in FIG. 12, a flag FK is reset at step 2220 when step 2190 determines that the sub-throttle valve control has ended. When the sub-throttle valve control starts in response to the YES determination at step 2140, step 2230 determines whether the sub-throttle valve control has just begun, judging from whether the flag FK remains reset. If the flag FK remains reset, it is then determined at step 2240 whether the brake control has reduced the inertial rotation of the driven wheel, judging from whether the driven-wheel speed VR has become lower than the reference value VS. While VR > VS, the control amount θS is determined at step 2260 using the formula (4). When VR becomes lower than VS, indicating that the driven wheel's inertial rotation has been reduced through the brake control, then the flag FK is set at step 2250, and the control amount θS is determined at step 2170 from the formula (3) using PBC.

By comparing the driven-wheel speed VR with the reference value VS as described above, the third embodiment can detect the precise time when the brake control has completely ended the driven wheel's inertial rotation. Therefore, the third embodiment can control the engine output torque more accurately than the second embodiment shown in FIG. 11 where the calculation of the control amount θS regarding the brake oil pressure PBC is automatically suspended for the fixed period.

In a vehicle having a fluid torque converter in the transmission between the engine and the driven wheel, the input rotational speed NE of the torque converter (i.e., the engine speed) at the beginning of the acceleration slippage is greater than the output rotational speed NEO of the torque converter. As the acceleration-slippage control proceeds, the input rotational speed NE will be less than or equal to the output rotational speed NEO. Thus, for this kind of vehicle the process for calculating the control amount θS in FIG. 12 may be further altered in the following manner. During the acceleration-slippage control, the output rotational speed NEO of the torque converter is obtained from the driven-wheel speed VR and the gear ratios of the differential gear and of the automatic transmission. The engine speed NE is compared with the obtained output rotational speed NEO. If NE>NEO, the control amount $\theta S$ for the sub-throttle valve 54 is determined from the formula (4) disregarding the brake oil pressure PBC. When NE has become lower than NEO, the control amount $\theta S$ is determined from the formula (3) using PBC.

As many different embodiments of this invention may be made without departing from these spirit and scope, the invention is not limited to these specific embodiments except as defined in the appended claims.

What is claimed is:

1. A controller for reducing acceleration slippage at a driven wheel of an automobile having an internal combustion engine, the controller comprising:
   a driven-wheel speed sensor for sensing a speed of the driven wheel;
   an acceleration-slippage detector for calculating slippage at the driven wheel based on the sensed driven-wheel speed when the automobile is accelerating;
   a throttle-valve controller for adjusting an opening of a throttle valve of the engine according to a control amount to control the slippage;
   a brake controller for adjusting a brake force on the driven wheel to control the slippage;
   a brake-force detector for detecting the brake force on the driven-wheel; and
   a correcting means for correcting the control amount such that the throttle valve is biased towards the closed position when the brake-force detector detects that the brake force on the driven wheel is increasing.

2. An acceleration-slippage controller, as in claim 1, where:
   the engine has a sub-throttle valve in addition to a main throttle valve;
   the throttle-valve controller adjusts an opening of the sub-throttle valve; and
   the control amount is the amount by which the throttle valve controller adjusts the opening of the sub-throttle valve.

3. An acceleration-slippage controller, as in claim 2, where the throttle-valve controller starts adjusting the throttle valve when the detected slippage exceeds a preset reference value, adjusts the opening of the sub-throttle valve such that the slippage converges on the reference value, and ends its adjustment when the opening of the sub-throttle valve exceeds the opening of the main throttle valve.

4. An acceleration-slippage controller, as in claim 3, where the driven wheel is equipped with a fluid brake system, and the brake-force detector detects a working-fluid pressure of a working fluid of the fluid brake system.

5. An acceleration-slippage controller, as in claim 4, where the brake controller starts adjusting the brake force when the slippage exceeds the reference value, adjusts the working-fluid pressure such that the slippage converges on the reference value, and ends adjustment of the brake force when the working-fluid pressure is zero.

6. An acceleration-slippage controller, as in claim 1, where the controller further comprises a delay means in communication with the correcting means for stopping the correcting means from correcting the throttle-valve controller for a predetermined period after the throttle-valve control starts.

7. An acceleration-slippage controller, as in claim 1, where the controller further comprises a delay means in communication with the correcting means for stopping the correcting means from correcting the throttle-valve controller until the slippage first falls below the reference value after the throttle-valve control starts.

* * * * *